US012695401B2

(12) United States Patent
Wang et al.

(10) Patent No.: US 12,695,401 B2
(45) Date of Patent: Jul. 28, 2026

(54) POWER TOOL AND CONTROL METHOD THEREFOR

(71) Applicant: Nanjing Chervon Industry Co., Ltd., Nanjing (CN)

(72) Inventors: Hailong Wang, Nanjing (CN); Tianxiao Xu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 181 days.

(21) Appl. No.: 18/539,561

(22) Filed: Dec. 14, 2023

(65) Prior Publication Data

US 2024/0120857 A1 Apr. 11, 2024

Related U.S. Application Data

(63) Continuation of application No. PCT/CN2022/138866, filed on Dec. 14, 2022.

(30) Foreign Application Priority Data

Feb. 22, 2022 (CN) .......................... 202210160181.9
Mar. 1, 2022 (CN) .......................... 202210194409.6

(51) Int. Cl.
*B25F 5/02* (2006.01)
*H02P 1/02* (2006.01)

(52) U.S. Cl.
CPC ................ *H02P 1/029* (2013.01); *B25F 5/02* (2013.01)

(58) Field of Classification Search
CPC .... H02P 1/029; H02P 6/08; H02P 6/20; H02P 6/24; B25F 5/02
See application file for complete search history.

(56) References Cited

U.S. PATENT DOCUMENTS 8,350,512 B2 * 1/2013 Matsunaga ............. H02P 29/00
318/446
9,438,141 B2 * 9/2016 Ishikawa ................... B25F 5/00
(Continued)

FOREIGN PATENT DOCUMENTS

CN 110445427 A 11/2021
CN 112332719 A 5/2023
(Continued)

OTHER PUBLICATIONS

International Search Report and Written Opinion of international application No. PCT/CN22/138866, mailed Feb. 17, 2023, 12 pp. (Translation of search report only).

(Continued)

*Primary Examiner* — Thai T Dinh
(74) *Attorney, Agent, or Firm* — Greenberg Traurig, LLP

(57) ABSTRACT

A power tool includes an operating switch; a motor that is connected to the operating switch and capable of starting in response to the conduction of the operating switch and braking in response to the disconnection of the operating switch; and a control circuit configured to control a working state of the motor. The control circuit includes a driver circuit including multiple switching elements; a controller that is coupled to the motor and capable of outputting a first control signal to control the motor to start; and a parameter detection unit for detecting a working parameter of the motor. The controller is configured to, in response to the operating switch being turned on again within a preset time after being turned off, acquire the working parameter and set a duty cycle of a second control signal according to the working parameter to control the motor to restart.

10 Claims, 6 Drawing Sheets

(56)     References Cited

U.S. PATENT DOCUMENTS

| | | | | |
|---|---|---|---|---|
| 11,047,528 | B2 * | 6/2021 | Vanko | F16P 7/02 |
| 11,179,824 | B2 * | 11/2021 | Kondo | B24B 47/12 |
| 11,607,792 | B2 * | 3/2023 | Wiker | H02P 3/06 |
| 2015/0013771 | A1 | 1/2015 | Quiles et al. | |
| 2015/0137717 | A1 * | 5/2015 | Ishikawa | H02P 3/12 |
| | | | | 318/379 |
| 2017/0023448 | A1 | 1/2017 | Fukushima et al. | |
| 2017/0057360 | A1 * | 3/2017 | Murthy | B60L 15/2009 |
| 2017/0234484 | A1 * | 8/2017 | Vanko | B24B 23/028 |
| | | | | 173/176 |
| 2021/0028732 | A1 * | 1/2021 | Xu | H02P 21/12 |

FOREIGN PATENT DOCUMENTS

| | | | |
|---|---|---|---|
| EP | 3780379 | A1 | 1/2022 |
| JP | 2011020187 | A | 2/2011 |

OTHER PUBLICATIONS

Office Action from EP application No. 22928395.7, dated Oct. 24, 2025, 7 pp.

* cited by examiner

POWER TOOL AND CONTROL METHOD THEREFOR

RELATED APPLICATION INFORMATION

This application is a continuation of International Application Number PCT/CN2022/138866, filed on Dec. 14, 2022, through which this application also claims the benefit under 35 U.S.C. § 119(a) of Chinese Patent Application No. 202210160181.9, filed on Feb. 22, 2022, and Chinese Patent Application No. 202210194409.6, filed on Mar. 1, 2022, which applications are incorporated herein by reference in their entireties.

TECHNICAL FIELD

The present application relates to a power tool and, in particular, to a power tool that can quickly restart during shutdown.

BACKGROUND

In some special scenarios, after shutting down a power tool, a user may need to restart the tool within a short period of time. If the tool is completely shut down and then restarted, the user experience and working efficiency are affected. For example, when using an electric blower to blow, the user needs to shut down the electric blower after finishing blowing a region to change the blowing angle, and then restart the blower to work in another work region. The smooth and quick restart of the electric blower is conducive to improving the working efficiency and feel. Alternatively, due to the large moment of inertia of a cutting disc, relatively long braking time, or no braking when using a cutting tool, after completing cutting once, the user needs to shut down the cutting tool and then restart the cutting tool for cutting next time. The smooth and quick restart of the cutting tool is conducive to improving the working efficiency and feel.

SUMMARY

In one example, a power tool includes an operating switch; a motor that is connected to the operating switch and capable of starting in response to the conduction of the operating switch and braking in response to the disconnection of the operating switch; and a control circuit configured to control a working state of the motor. The control circuit includes a driver circuit including multiple switching elements; a controller that is coupled to the motor and capable of outputting a first control signal to control the motor to start; and a parameter detection unit for detecting a working parameter of the motor. The controller is configured to, in response to the operating switch being turned on again within a preset time after being turned off, acquire the working parameter and set a duty cycle of a second control signal according to the working parameter to control the motor to restart.

In one example, a power tool includes an operating switch; a motor that is connected to the operating switch and capable of starting in response to the conduction of the operating switch and braking in response to the disconnection of the operating switch; and a control circuit configured to control a working state of the motor. The control circuit includes a driver circuit including multiple switching elements; a controller that is coupled to the motor and capable of outputting a first control signal to control the motor to start; and a parameter detection unit for detecting a working parameter of the motor. The controller is configured to, in response to the operating switch being turned on again within a preset time after being turned off, acquire the working parameter and set a duty cycle of a third control signal at any moment during a restarting process of the motor according to the working parameter.

In one example, a power tool includes an operating switch; a motor that is connected to the operating switch and capable of starting in response to the conduction of the operating switch and braking in response to the disconnection of the operating switch; and a control circuit configured to control a working state of the motor. The control circuit includes a driver circuit including multiple switching elements; and a controller that is coupled to the motor and capable of outputting a first control signal to control the motor to start. The controller is configured to, in response to the operating switch being turned on again within a preset time after being turned off, output a second control signal with a variable duty cycle to control the motor to restart.

In one example, a power tool includes an operating switch; a motor that is connected to the operating switch and capable of starting in response to the conduction of the operating switch and braking in response to the disconnection of the operating switch; and a control circuit configured to control a working state of the motor. The control circuit includes a driver circuit including multiple switching elements; and a controller that is coupled to the motor and capable of outputting a first control signal with a first duty cycle to control the motor to start. The controller is configured to, in response to the operating switch being turned on again within a preset time after being turned off, output a second control signal with a second duty cycle to control the motor to restart, where the second duty cycle is different from the first duty cycle.

In one example, a power tool includes a motor including a rotor and multiple phases of stator windings; and a control circuit configured to control a working state of the motor. The control circuit includes a driver circuit including multiple high-side switching elements and multiple low-side switching elements; and a controller that is electrically connected to at least the driver circuit and capable of outputting a control signal to control the switching elements in the driver circuit to be turned on to form a driving state or a freewheeling state. The controller is configured to detect an electrical parameter of a first switching element in the driver circuit and control the time during which the driver circuit is in the freewheeling state according to a relationship between the electrical parameter and a preset parameter threshold. The first switching element is a non-conducting switching element among the high-side switching element and the low-side switching element connected to the same stator winding in the driver circuit.

In one example, a power tool includes a brushless motor including a rotor and multiple phases of stator windings; and a control circuit configured to control a working state of the motor. The control circuit includes a driver circuit including multiple high-side switching elements and multiple low-side switching elements; and a controller that is electrically connected to at least the driver circuit and capable of outputting a control signal to control the switching elements in the driver circuit to be turned on to form a driving state or a freewheeling state. The controller is configured to detect an electrical parameter of a first switching element in the driver circuit and control the time during which the driver circuit is in the freewheeling state according to a relationship between the electrical parameter and a preset parameter threshold. The first switching element is a non-conducting switching element among the high-side switching element and the low-side switching element connected to the same stator winding in the driver circuit.

In a control method for a power tool, the power tool includes a motor including a rotor and multiple phases of stator windings; and a control circuit configured to control a working state of the motor. The control circuit includes a driver circuit including multiple high-side switching elements and multiple low-side switching elements; and a controller that is electrically connected to at least the driver circuit and capable of outputting a control signal to control the switching elements in the driver circuit to be turned on to form a driving state or a freewheeling state. The method includes detecting the current of a first switching element in the driver circuit; and controlling the time during which the driver circuit is in the freewheeling state according to a relationship between the current and a preset current threshold. The first switching element is a non-conducting switching element among the high-side switching element and the low-side switching element connected to the same stator winding in the driver circuit.

DETAILED DESCRIPTION

Unless otherwise defined, all technical and scientific terms used herein have the same meanings as those commonly understood by those skilled in the art to which the present invention pertains. The terms used in the specification of the present application are merely used for describing the examples and not intended to limit the present application. The term "and/or" used herein includes any or all combinations of at least one listed associated item.

Power tools to which the technical solutions of the present application are applicable include handheld power tools, fastening power tools, cutting power tools, sanding power tools, and the like. For example, the power tools include an electric drill, an electric circular saw, a reciprocating saw, a miter saw, an impact wrench, an impact screwdriver, and a hammer anvil. Other types of power tools which can adopt the substance of the technical solutions disclosed below may fall within the scope of the present application.

Figure 1:
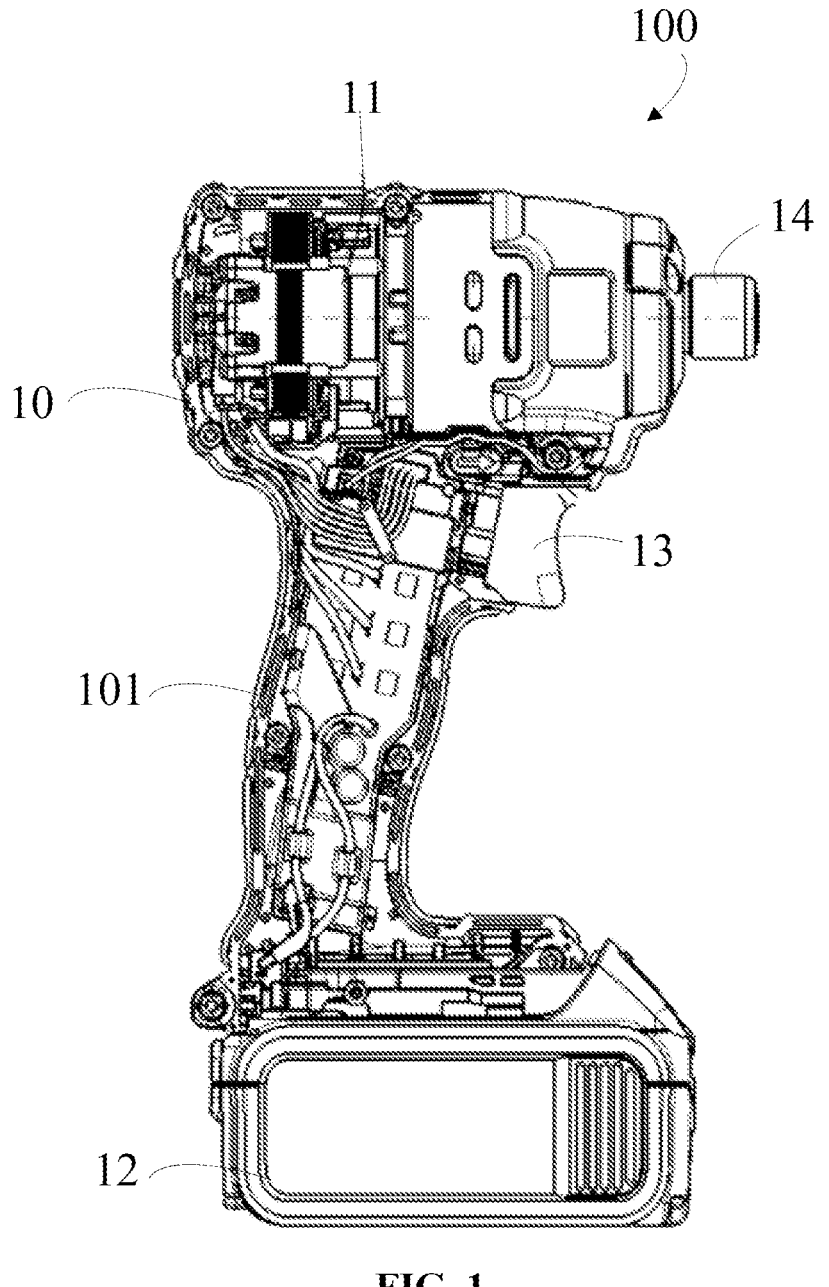
FIG. 1 is a structural view of a power tool in an example of the present application.

In an example of the present application, referring to a power tool 100 shown in FIG. 1, the power tool 100 includes at least a housing 10, a motor 11 in the housing, a power supply 12, an operating switch 13, a working head 14, and the like. The motor, a control circuit board, and a transmission structure are disposed in the housing 10. The housing 10 is further formed with a grip 101 for a user to hold. The operating switch 13 is operable by the user to turn on or off the machine. For example, the operating switch 13 may be operated by the user to be turned on so that the power tool 100 may be controlled to be turned on, and the operating switch 13 may be operated by the user to be turned off so that the power tool 100 may be controlled to be turned off. It is to be understood that the operating switch 13 is coupled to a control circuit or a controller on the control circuit board in the housing 10. The operated operating switch 13 can trigger the control logic of the control circuit to control the power tool 100 to be turned on or off.

Figure 2:
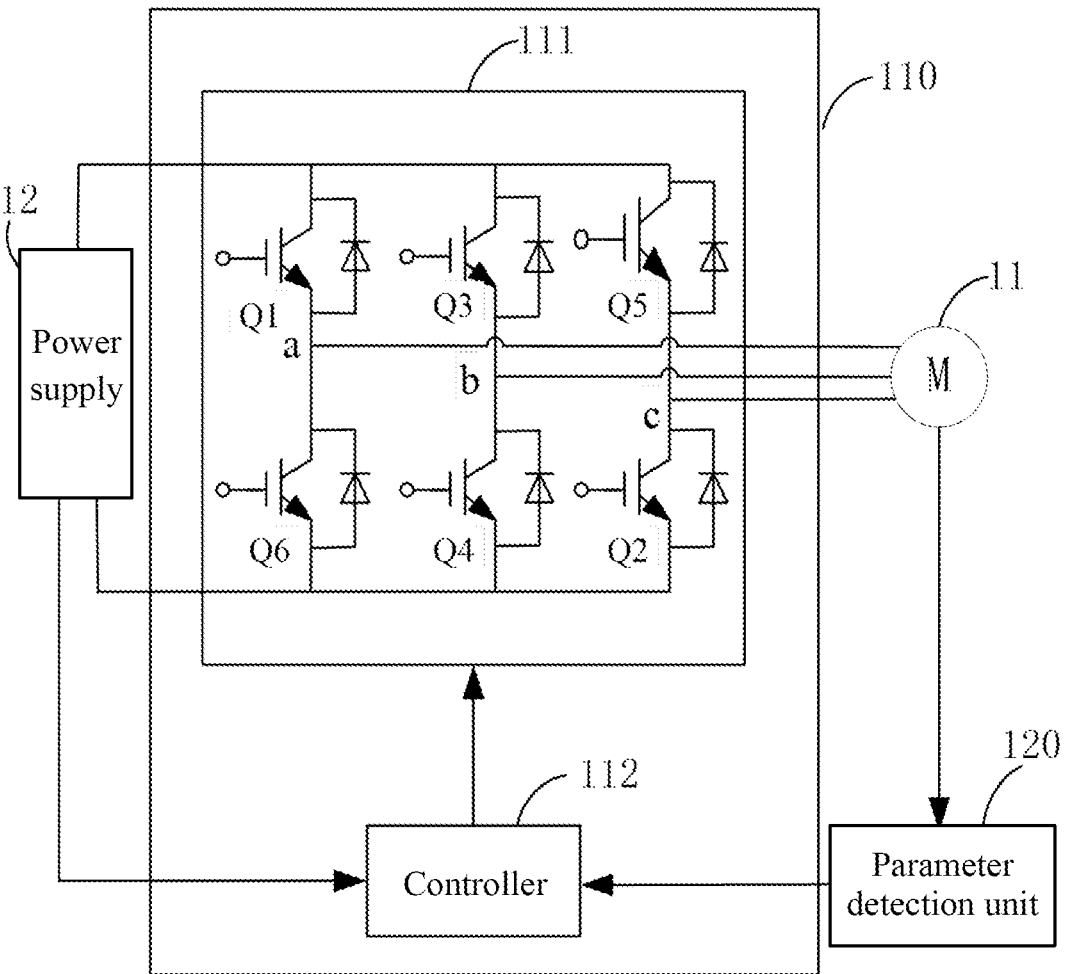
FIG. 2 is a circuit diagram of a control system of the power tool in FIG. 1.

Referring to a circuit block diagram of the power tool 100 shown in FIG. 2, a driving system of the motor 11 may include at least the power supply 12 and a control circuit 110, where the control circuit 110 may include a driver circuit 111 and a controller 112.

In an example, the motor 11 is a brushless direct current motor (BLDC). In an example, the motor 11 is a sensor-less BLDC. In an example, the motor 11 is a BLDC with a sensor. In the present application, the BLDC may be an inrunner or an outrunner, and the motor includes at least three-phase stator windings A, B, and C in a star connection or a triangular connection.

In an example, the power supply 12 may optionally be an alternating current power supply, that is, alternating current mains power of 120 V or 220 V may be connected through a power interface. In an example, the power supply 12 may optionally be a battery pack. The battery pack may be formed by a group of battery cells. For example, the battery cells may be connected in series into a single power supply branch to form a 1P battery pack. The output voltage of the battery pack may be changed by a power supply control module such as a direct current-direct current (DC-DC) module such that a power supply voltage suitable for the control circuit 110, the motor 11, and the like is outputted, so as to supply power to the control circuit 110, the motor 11, and the like. It is to be understood by those skilled in the art that the DC-DC module is a mature circuit structure and may be selected accordingly according to the parameter requirements of the power tool.

The driver circuit 111 is electrically connected to the stator windings A, B, and C of the motor 11 and configured to transmit the current from the power supply 12 to the stator windings A, B, and C to drive the motor 11 to rotate. In an example, the driver circuit 111 includes multiple switching elements Q1, Q2, Q3, Q4, Q5, and Q6. A gate terminal of each switching element is electrically connected to the controller 112 and configured to receive a control signal from the controller 112, where the control signal may be a pulse-width modulation (PWM) signal. The drain or source of each switching element is connected to the stator windings A, B, and C of the motor 11. The switching elements Q1 to Q6 receive control signals from the controller 112 to change respective conduction states, thereby changing the current loaded to the stator windings A, B, and C of the motor 11 by the power supply 12. In an example, the driver circuit 111 may be a three-phase bridge driver circuit including six controllable semiconductor power devices (such as field-effect transistors (FETs), bipolar junction transistors (BJTs), or insulated-gate bipolar transistors (IGBTs)). It is to be understood that the preceding switching elements may be any other types of solid-state switches, such as the IGBTs or the BJTs.

To drive the motor 11 shown in FIG. 2 to rotate, the driver circuit 111 has multiple driving states, and the motor 11 may have different rotational speeds or different directions of rotation in different driving states. In the present application, the process is not described in detail where the controller 112 controls the driver circuit 111 to change different driving states such that the motor 11 has different rotational speeds or different directions of rotation.

In an example, after the operating switch 13 is triggered by the user according to the set method, a power-on signal, a power-off signal, a braking signal, a deceleration signal, an acceleration signal, or the like may be outputted to the controller 112. Therefore, the controller 112 may control the switching elements in the driver circuit 111 to change the conduction states according to the received signals to achieve corresponding control purposes. For example, when the operating switch 13 is operated by the user to be turned on, the controller 112 can control the motor 11 to start; and when the operating switch 13 is operated by the user to be turned off, the controller 112 can control the motor 11 to brake.

In an example, the driving system of the motor 11 shown in FIG. 2 may further include a parameter detection unit 120. The parameter detection unit 120 may be connected to the control circuit 110 or the motor 11 and can detect the working parameter of the motor 11 or the electrical parameter of the control circuit 110. For example, the parameter detection unit 120 can detect the phase current, phase voltage, or back electromotive force of each phase winding of the motor 11 or the number of rotations of the motor and can also detect parameters such as the bus current or bus voltage on a main loop of the control circuit 110.

In an example, after the user controls the operating switch 13 to control the motor 11 to brake, if the motor 11 needs to restart, the motor 11 generally completely stops rotating before the motor 11 can be controlled to start, affecting the use efficiency of the tool and reducing the user experience. That is to say, since the tool cannot respond to a restart operation during the shutdown process, the requirement for smoothly restarting the tool within a short period of time after a shutdown operation may not be satisfied in some special circumstances. For example, in the working process of a blower, when the blowing position or blowing angle changes, the blower needs to be shut down and then quickly and smoothly restarted, or after a cutting tool finishes cutting a workpiece, the tool needs to be shut down and then quickly and smoothly restarted to cut the next workpiece. The restarting of the preceding tool within a short period of time after the tool is shut down can be understood as the restarting of the tool before the tool completely stops working or the restarting of the motor before the motor completely stops rotating.

Before describing the examples for solving the preceding problems, a first control signal, a second control signal, a third control signal, and a braking signal are defined first. In the example of the present application, the first control signal is outputted when the controller 112 controls the motor 11 to start from a complete shutdown state. The braking signal controls the motor to brake. The second control signal is outputted when the controller 112 controls the motor 11 to restart during braking. The third control signal is a control signal at any moment during a restarting process of the motor 11 and may include the second control signal. That is to say, the controller 112 may output the first control signal to control the motor 11 to start operating, output the braking signal to control the motor 11 to brake when braking is required, and output the second control signal during a braking process of the motor 11 to control the motor 11 to restart.

In an example, in response to the operating switch 13 being turned on again within a preset time after being turned off, the controller 112 may output the second control signal with a variable duty cycle to control the motor to restart. In this example, the rotational speed of the motor 11 is greater than zero within the preset time, that is, the motor 11 does not completely stop rotating within the preceding preset time. That is to say, before the motor 11 completely brakes, the controller 112 may control the motor 11 to stop braking, convert the current brake torque into the starting torque, and control the motor 11 to restart.

In this example, the duty cycle of the second control signal is a non-fixed value. The controller 112 may set the preceding variable duty cycle according to the working parameter of the motor 11 or the electrical parameter of the control circuit 110 or may set the variable duty cycle randomly. The working parameter of the motor 11 may be at least one of the phase current of the motor windings, the phase voltage of the motor windings, or the rotational speed of the motor, and the electrical parameter of the control circuit 110 may be the bus current or bus voltage in the circuit.

In an example, the preceding preset time may be calculated from when the controller 112 detects the braking signal. The duration of the preset time may be related to the rotational state of the motor 11 when the controller 112 detects the braking signal. For example, when the braking signal is detected, if the rotational speed of the motor 11 is higher, the corresponding preset time is longer, and vice versa. That is to say, the preset time built into the control circuit 110 is not a fixed value, and different rotational speeds during braking correspond to different preset times. Generally, within the preset time, the motor 11 may brake by inertia or a reverse braking force generated by the motor 11. In different braking methods, the same rotational speed during braking may correspond to different preset times.

In an example, when detecting a start signal again within a preset time after detecting the braking signal, the controller 112 may acquire the back electromotive force of the windings of the motor 11 and at the same time, acquire the bus voltage of the control circuit 110. The preceding back electromotive force is the back electromotive force of the winding with the maximum back electromotive force among the three phases of windings. Furthermore, the controller 112 can calculate the duty cycle of the second control signal that controls the restart of the motor 11 by analyzing the acquired back electromotive force and bus voltage. The controller 112 may set a ratio of the working parameter to an electrical parameter of the control circuit to be the duty cycle of the second control signal. For example, the controller 112 may set the ratio of the preceding back electromotive force to the preceding bus voltage to be the duty cycle of the second control signal. That is to say, when the user controls the operating switch 13 to turn on the machine again within a short period of time after the user controls the operating switch 13 to turn off the machine, the ratio of the maximum back electromotive force of the windings of the motor 11 to the bus voltage of the control circuit 110 is the duty cycle of the second control signal for restarting the motor 11. In this example, the maximum back electromotive force of the motor windings is less than the bus voltage. In particular, if the controller 112 detects the start signal during the braking process of the motor 11 and the maximum back electromotive force of the windings of the motor 11 acquired by the controller 112 is greater than the bus voltage, then the duty cycle of the second control signal is set to 100%.

In some circumstances, during the braking process of the motor 11, if the start signal for restarting the motor 11 is detected when the rotational speed of the motor 11 is already very low, since the rotor position of the motor 11 cannot be accurately acquired, the controller 112 cannot directly control the motor 11 to restart, but the motor 11 needs to completely stop before the controller 112 can control the motor 11 to restart. That is to say, even if the motor 11 does not completely stop rotating within a preset time after the motor 11 brakes, the controller 112 may not be capable of controlling the motor 11 to restart in response to the operating switch 13 being turned on again.

To avoid the preceding case, the working parameter of the motor 11 within the preset time is greater than or equal to a parameter threshold. For example, the working parameter is voltage. In this way, when acquiring the maximum back electromotive force of the motor windings, the controller 112 may determine whether the maximum back electromotive force is greater than or equal to a voltage threshold. If so, the controller 112 outputs the second control signal and sets the duty cycle of the second control signal according to the maximum back electromotive force and the bus voltage; otherwise, the controller 112 does not output the second control signal, that is, the controller 112 does not respond to the restart operation of the user. The voltage threshold may be the minimum back electromotive force of the motor windings that enables the rotor position to be detected. The minimum back electromotive force refers to the minimum value of the maximum back electromotive force of the three-phase motor windings when the rotor position can be detected normally during the braking process of the motor 11.

In an example, when detecting the start signal again within the preset time after detecting the braking signal, the controller 112 may acquire the phase voltage of the motor windings and the bus voltage of the control circuit 110 and set the ratio of the voltage to the bus voltage of the control circuit to be the duty cycle of the second control signal.

In this example, the second control signal with the variable duty cycle is used to control the motor to restart after the motor brakes, shortening the startup time by about 50 ms compared to the restart of the motor after the motor completely brakes. Since the duty cycle of the second control signal for restarting the motor is related to the working parameter of the motor or the electrical parameter of the control circuit, the restart of the motor can adapt to the operation state before the motor restarts, thereby avoiding lagging or unsmoothness during restarting.

Figure 3:
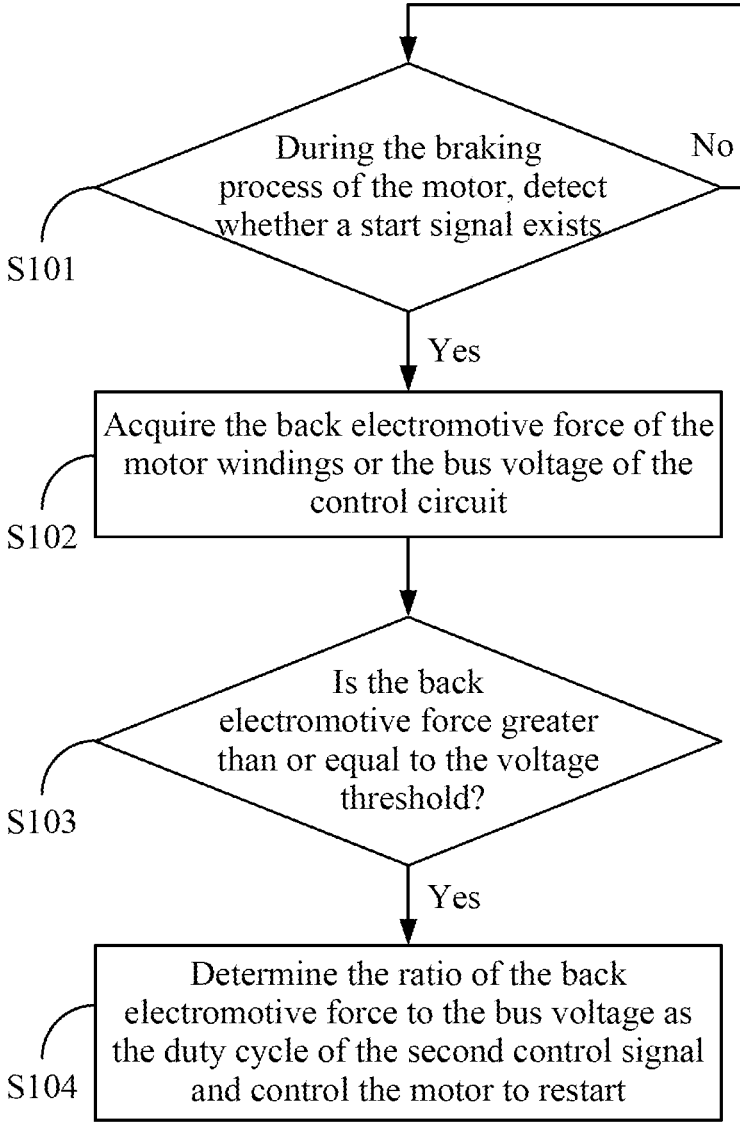
FIG. 3 is a control flowchart of a control system of the power tool in FIG. 1.

Referring to a control flowchart of a control system of the power tool in the preceding examples shown in FIG. 3, the following steps are included.

In S101, during the braking process of the motor, whether a start signal exists is detected. If so, step S102 is performed, otherwise the detection is continued.

In S102, the back electromotive force of the motor windings and the bus voltage of the control circuit are acquired.

In S103, whether the back electromotive force is greater than or equal to the voltage threshold is determined. If so, step S104 is performed, otherwise no action is taken until the motor completely stops rotating.

In S104, the ratio of the back electromotive force to the bus voltage is determined as the duty cycle of the second control signal and the motor is controlled to restart.

In another example, the duty cycle of the first control signal is defined as a first duty cycle. The first duty cycle may be a preset fixed value or a non-fixed value set according to a certain rule. In this example, in response to the operating switch being turned on again within the preset time after being turned off, the controller 112 can output the second control signal with a second duty cycle to control the motor 11 to restart. The second duty cycle is different from the first duty cycle. In an example, the controller 112 may set the second duty cycle according to the working parameter of the motor 11 or the electrical parameter of the control circuit 110 or set the second duty cycle randomly, as long as the second duty cycle is different from the first duty cycle.

In this example, for the process of setting the second duty cycle by the controller 112 according to the working parameter of the motor 11 or the electrical parameter of the control circuit 110, reference may be made to the process of setting the variable duty cycle in the preceding embodiments, and the details are not repeated here.

In another example, in response to the operating switch being turned on again within the preset time after being turned off, the controller 112 can acquire the working parameter of the motor and set the duty cycle of the third control signal at any moment during the restarting process of the motor 11 according to the working parameter. The third control signal is a control signal at any moment during the restarting process of the motor 11 and may include the second control signal at the initial restarting moment.

In an example, when the controller 112 responds to the restart operation of the motor, as described in the preceding embodiments, the controller 112 may set the second duty cycle or variable duty cycle of the second control signal according to the preceding working parameter or electrical parameter.

In an example, when the controller 112 responds to the restart operation of the motor, the second duty cycle of the second control signal outputted at the initial moment may be consistent with the first duty cycle of the first control signal. Within at least one signal period after the second control signal is outputted, according to the working parameter of the motor 11 or the electrical parameter of the control circuit, the controller 112 may change the duty cycle of the third control signal during operation after the motor 11 restarts. Since the preceding at least one signal period is relatively short, even if the duty cycle of the control signal after the motor restarts is set according to the working parameter of the motor or the electrical parameter of the control circuit after the at least one signal period, the restart of the motor can adapt to the operation state before the motor restarts, thereby shortening the time for the motor to restart and avoiding lagging or unsmoothness during restarting.

Figure 4:
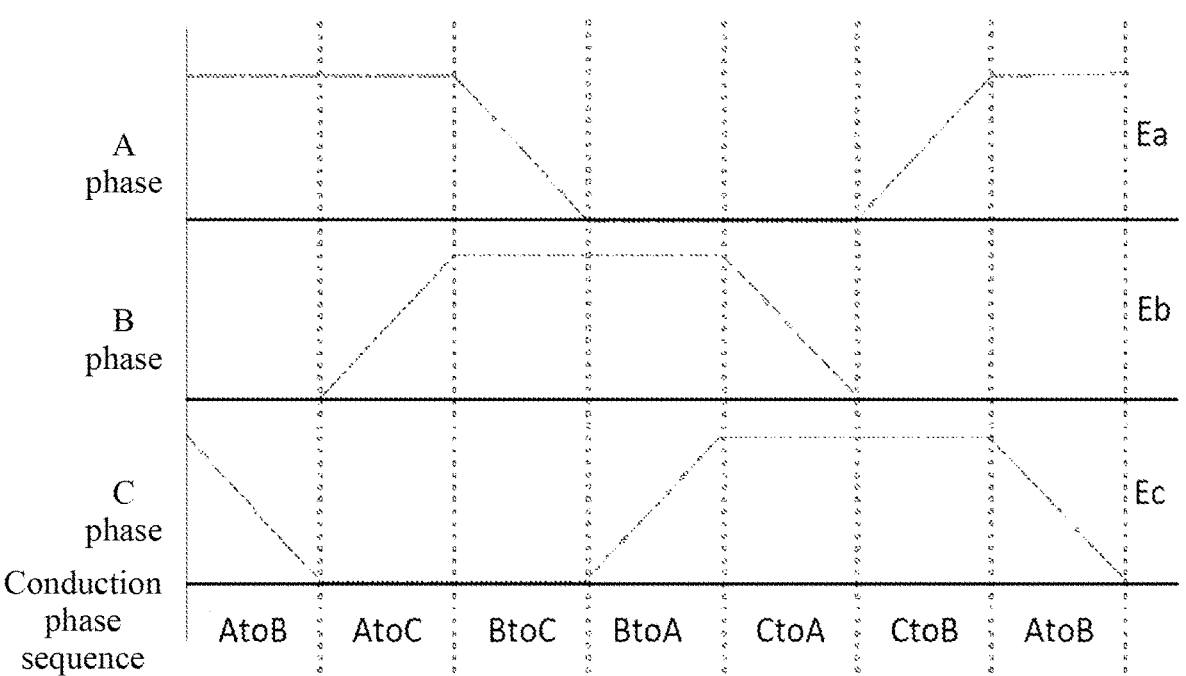
FIG. 4 is a schematic diagram of the periodic commutation of pairwise conduction of motor windings according to an example of the present application.
Figure 5:
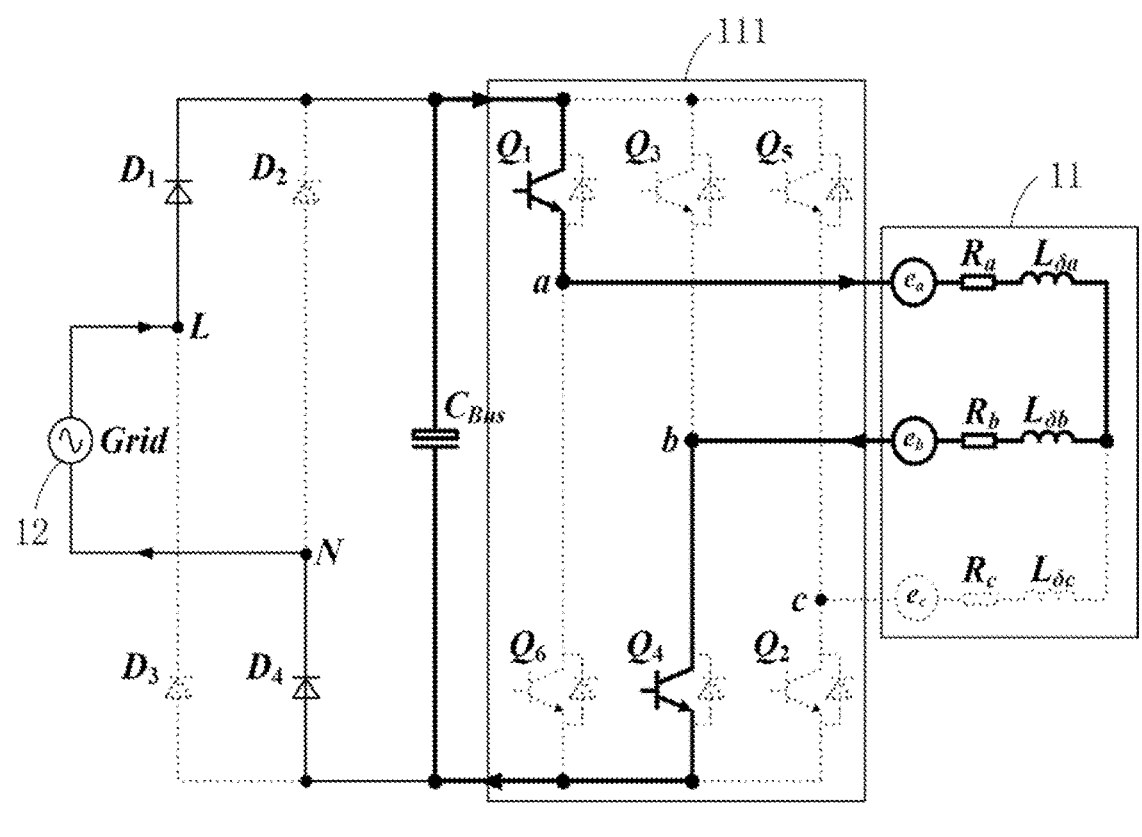
FIG. 5 is a schematic diagram of the conduction states of switching elements in a driver circuit when motor windings are turned on in pairs according to an example of the present application.

In an example, the driver circuit 111 includes multiple switching elements Q1, Q2, Q3, Q4, Q5, and Q6. Q1, Q3, and Q5 are high-side switching elements, and Q2, Q4, and Q6 are low-side switching elements. Any phase of stator winding of the motor 11 is connected to one high-side switching element and one low-side switching element. In this example, a non-conducting switching element among the high-side switching element and the low-side switching element connected to the same winding is defined as a first switching element, and the other switching element is a conducting switching element and defined as a second switching element. For example, in FIGS. 5, Q1 and Q6 are connected to the same winding, Q6 is not turned on, and Q1 is turned on, then Q6 is the first switching element and Q1 is the second switching element. Generally, the driver circuit 111 has at least six driving states, and each switching of the driving state corresponds to one commutation action of the motor. In an example, the controller 112 may output a PWM control signal to control the driver circuit 111 to switch the driving state. As shown in FIG. 4, a horizontal axis represents commutation points of a stator within a cycle of 360°, and a vertical axis represents back electromotive forces of the three phases of windings. In FIG. 4, the motor commutates once every 60° by which the rotor rotates, and an interval from one commutation to the next commutation of the motor is defined as a commutation interval. Therefore, within a commutation cycle of 360°, six commutations exist, and the three phases of windings of the motor are all turned on for 120°. The commutation manner of the stator windings shown in FIG. 4 is generally referred to as a manner in which two phases of windings commutate and are turned on, that is, a pairwise conduction manner. As shown in FIG. 5, in the pairwise conduction manner, one high-side switching element Q1 and one low-side switching element Q4 connected to different windings in the driver circuit 111 are turned on so that the two phases of windings A and B of the motor are turned on. When the motor windings commutate and are turned on in the pairwise conduction manner, due to the motor inductance, the shutdown phase current cannot suddenly change to zero (that is, the phase current on the windings does not suddenly change to zero after commutation). In this case, the shutdown phase current freewheels through an antiparallel diode, causing a body diode to heat up. During the process of continuous commutations of the driver circuit 111 in the driving state, the body diode of the switching element continues heating up, causing the switching element to overheat.

Figure 6:
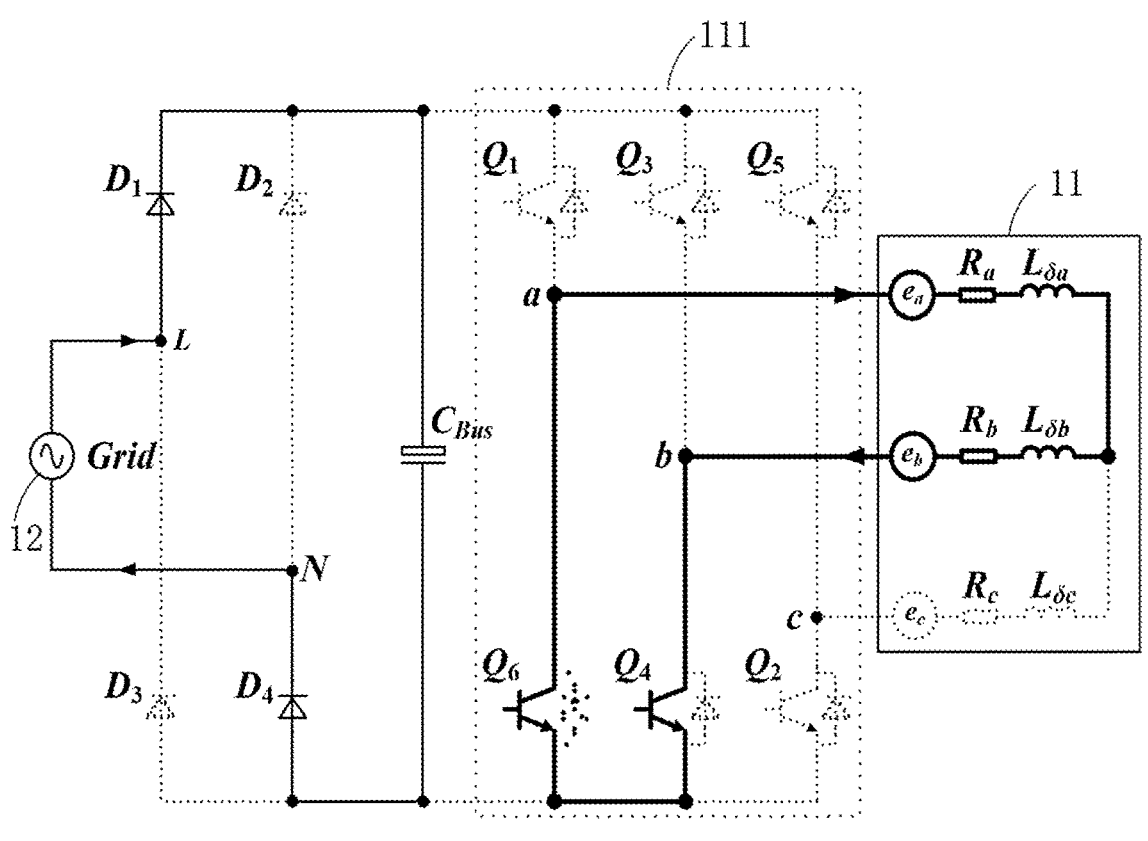
FIG. 6 is a schematic diagram of the driver circuit shown in FIG. 5 switching to a freewheeling state.

To reduce the heat of the switching elements in the driver circuit 111, the controller 112 may periodically or randomly control the driver circuit 111 to switch from the driving state to the freewheeling state, so as to reduce the large amount of heat generated by the switching elements in the driver circuit 111 due to the commutation and freewheeling. In an example, the controller 112 may control any currently turned-on switching element to be turned off and control the switching element connected to the same winding as the turned-off switching element to be turned on, thereby forming a freewheeling circuit, that is, the driver circuit 111 is in the freewheeling state. As shown in FIG. 6, the controller 112 may control Q1 to be turned off and Q6 to be turned on so that the freewheeling current no longer flows through the body diode of Q6, but freewheels through the switching element Q6, thereby reducing the heat of the switching element due to freewheeling. At the same time, the driving efficiency of the motor is improved. For example, when the tool is working under the light load, the temperature can be reduced by about 10° to achieve thermal balance, and the driving efficiency of the motor can be increased by about 4% to 5%.

Figure 7:
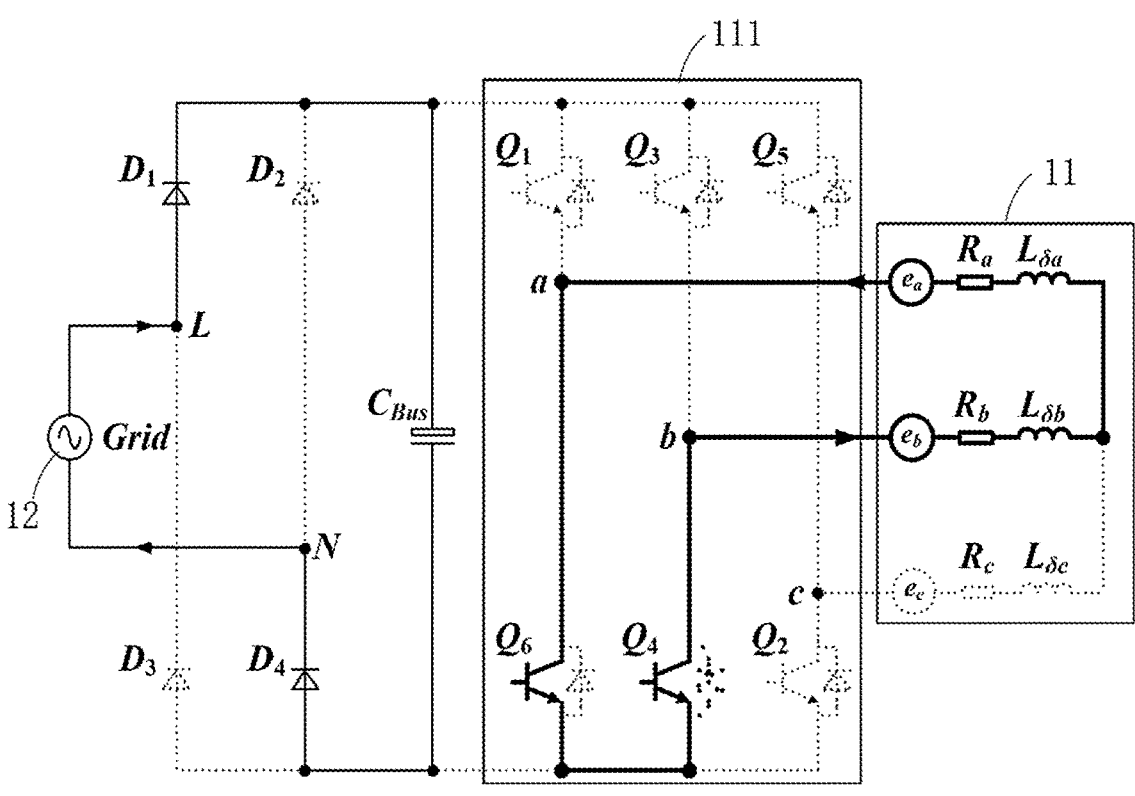
FIG. 7 is a schematic diagram of the driver circuit shown in FIG. 6 generating a reverse braking current in the freewheeling state.

However, if the controller 112 cannot well control the time during which the driver circuit 111 is in the preceding freewheeling state, a braking phenomenon may occur. In the freewheeling state shown in FIG. 6, the switching elements Q6 and Q4 and the windings A and B form the freewheeling circuit. In this freewheeling circuit, the drive current in the windings A and B freewheels through Q4 and Q6. If the freewheeling state shown in FIG. 6 lasts for a relatively long time, the drive current is consumed, but due to inertia or other reasons, the motor 11 still continues rotating, generating a braking current that is opposite to the preceding drive current. As shown in FIG. 7, the rotational speed of the motor gradually decreases under the braking of the braking current, resulting in the braking phenomenon. However, in the normal working process of the tool, the preceding braking phenomenon is not expected to occur. Therefore, the time during which the driver circuit 111 maintains the freewheeling state needs to be controlled.

In an example, the controller 112 may monitor the electrical parameter of the first switching element in the driver circuit and control the time during which the driver circuit maintains the freewheeling state according to the relationship between the electrical parameter and a preset parameter threshold.

In an example, in the driving state shown in FIG. 5, the controller 112 may detect the current value of the first switching element Q6 and when the detected current is greater than or equal to a current threshold, control the driver circuit 111 to switch to the freewheeling state shown in FIG. 6 for freewheeling to cool down the switching element. In this example, the controller 112 may continuously monitor the current of the first switching element Q6 and when the current is less than the current threshold, control the driver circuit 111 to switch from the freewheeling state to the driving state. That is to say, by detecting the current in the driver circuit 111, the time during which the driver circuit 111 maintains the freewheeling state may be controlled to avoid the braking phenomenon.

In an example, the controller 112 may also monitor the freewheeling time of the first switching element Q6 during commutation. For example, the freewheeling time refers to the time for the first switching element Q6 to freewheel through the body diode when the switching element in the driver circuit commutates. In an example, the controller 112 may control the time during which the driver circuit 111 maintains the freewheeling state according to the relationship between the time for the first switching element Q6 to freewheel through the body diode and a preset freewheeling time threshold. For example, when the freewheeling time is greater than or equal to the preset freewheeling time threshold, the driver circuit 111 is controlled to switch to the freewheeling state and the freewheeling time of the first switching element is detected continuously. When the freewheeling time of the first switching element is less than the preceding threshold, the driver circuit is controlled to switch from the freewheeling state to the driving state.

In the example of the present application, the electrical parameter of the first switching element may be the current, the freewheeling time, or any other parameter that can reflect the circuit state.

In an optional example, the time during which the driver circuit 111 maintains the freewheeling state may be controlled by monitoring the electrical parameter of the second switching element.

In an example, if the duty ratio of the PWM control signal outputted by the controller is relatively large, the preceding freewheeling control method does not need to be used. When the duty ratio is relatively large, the energy consumed in turning on the first switching element is also relatively large, and the purpose of reducing heat cannot be achieved. Therefore, before controlling the driver circuit 111 to switch to the freewheeling state, the controller 112 also needs to determine, according to the duty cycle of the control signal, whether to switch to the freewheeling state. That is to say, when the electrical parameter of the first switching element is greater than or equal to a parameter threshold and the duty cycle of the PWM control signal is less than a preset duty cycle, the controller 112 controls the first switching element to be turned on to switch the driver circuit to the freewheeling state.

Figure 8:
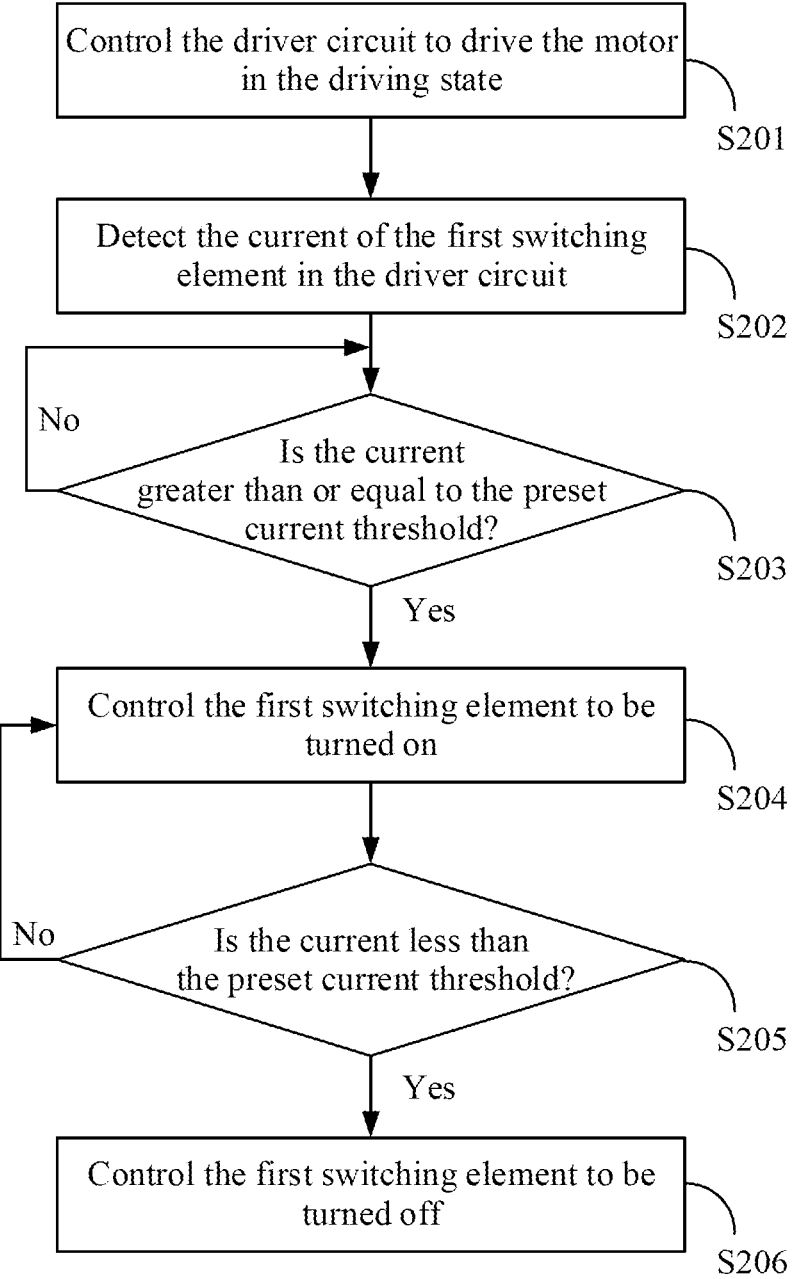
FIG. 8 is a flowchart of a control method for a tool control system according to an example of the present application.

Referring to a control flowchart of a control system of the power tool in the preceding examples shown in FIG. 8, the following steps are included.

In S201, the driver circuit is controlled to drive the motor in the driving state.

In S202, the current of the first switching element in the driver circuit is detected.

In S203, whether the current is greater than or equal to the preset current threshold is determined. If so, step S204 is performed, otherwise the detection is continued.

In S204, the first switching element is controlled to be turned on so that the driver circuit switches to the freewheeling state.

In S205, whether the current is less than the preset current threshold is determined. If so, step S206 is performed, otherwise step S204 is performed.

In S206, the first switching element is controlled to be turned off so that the driver circuit switches from the freewheeling state to the driving state.

What is claimed is:

1. A power tool, comprising:

a motor comprising a rotor and a plurality of phases of stator windings; and a control circuit configured to control a working state of the motor;

wherein the control circuit comprises a driver circuit comprising a plurality of high-side switching elements and a plurality of low-side switching elements and a controller electrically connected to at least the driver circuit and capable of outputting a control signal to control a first switching element in the driver circuit to be turned on so as to switch the driver circuit from a driving state to a freewheeling state, the controller is configured to detect an electrical parameter of the first switching element in the driver circuit and control time during which the driver circuit is in the freewheeling state according to a relationship between the electrical parameter and a preset parameter threshold to avoid a braking phenomenon of the control circuit, and the first switching element is a turned off switching element among one of the plurality of high-side switching elements and one of the plurality of low-side switching elements connected to a same one of the plurality of phases of stator windings in the driver circuit.

2. The power tool of claim 1, wherein the electrical parameter comprises a current of the first switching element or the time for the first switching element to freewheel through a body diode when the first switching element in the driver circuit commutates.

3. The power tool of claim 1, wherein the controller is configured to control the first switching element to be turned on so that the driver circuit operates in the freewheeling state when the electrical parameter is greater than or equal to the preset parameter threshold and control the first switching element to be turned off so that the driver circuit switches from the freewheeling state to the driving state when the electrical parameter is less than the preset parameter threshold.

4. The power tool of claim 1, wherein the controller is configured to control the time during which the driver circuit is in the freewheeling state according to the relationship between the electrical parameter and the preset parameter threshold when a duty cycle of the control signal is less than a preset duty cycle threshold.

5. A power tool, comprising:

a brushless motor comprising a rotor and a plurality of phases of stator windings; and a control circuit configured to control a working state of the motor;

wherein the control circuit comprises a driver circuit comprising a plurality of high-side switching elements and a plurality of low-side switching elements and a controller electrically connected to at least the driver circuit and capable of outputting a control signal to control a first switching element in the driver circuit to be turned on so as to switch from the driver circuit from a driving state to a freewheeling state, the controller is configured to detect an electrical parameter of the first switching element in the driver circuit and control time during which the driver circuit is in the freewheeling state according to a relationship between the electrical parameter and a preset parameter threshold to avoid a braking phenomenon of the control circuit, and the first switching element is a turned off switching element among one of the plurality of high-side switching elements and one of the plurality of low-side switching elements connected to a same one of the plurality of phases of stator windings in the driver circuit.

6. The power tool of claim 5, wherein the electrical parameter comprises a current of the first switching element or the time for the first switching element to freewheel through a body diode when the first switching element in the driver circuit commutates.

7. The power tool of claim 5, wherein the controller is configured to control the first switching element to be turned on so that the driver circuit operates in the freewheeling state when the electrical parameter is greater than or equal to the preset parameter threshold and control the first switching element to be turned off so that the driver circuit switches from the freewheeling state to the driving state when the electrical parameter is less than the preset parameter threshold.

8. A control method for a power tool comprised of a motor comprising a rotor and a plurality of phases of stator windings and a control circuit configured to control a working state of the motor, wherein the control circuit comprises a driver circuit comprising a plurality of high-side switching elements and a plurality of low-side switching elements and a controller that is electrically connected to at least the driver circuit and capable of outputting a control signal to control a first switching element in the driver circuit to be turned on so as to switch the driver circuit from a driving state to a freewheeling state, the first switching element is a turned off switching element among one of the plurality of high-side switching elements and one of the plurality of low-side switching elements connected to a same one of the plurality of phases of stator windings in the driver circuit, and the method comprises:

detecting a current of the first switching element in the driver circuit; and controlling time during which the driver circuit is in the freewheeling state according to a relationship between the current and a preset current threshold to avoid a braking phenomenon of the control circuit.

9. The method of claim 8, further comprising controlling the first switching element to be turned on so that the driver circuit operates in the freewheeling state when the current is greater than or equal to the preset current threshold and controlling the first switching element to be turned off so that the driver circuit switches from the freewheeling state to the driving state when the current is less than the preset current threshold.

10. The method of claim 8, further comprising controlling the time during which the driver circuit is in the freewheeling state according to the relationship between the current and the preset current threshold when a duty cycle of the control signal is less than a preset duty cycle threshold.

* * * * *